(12) United States Patent
Yu

(10) Patent No.: US 11,618,322 B2
(45) Date of Patent: Apr. 4, 2023

(54) DRIVER ASSISTANCE SYSTEM AND VEHICLE HAVING THE SAME

(71) Applicants: Hyundai Motor Company, Seoul (KR); Kia Corporation, Seoul (KR)

(72) Inventor: Keungyu Yu, Gunsan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/476,147

(22) Filed: Sep. 15, 2021

(65) Prior Publication Data

US 2022/0126691 A1   Apr. 28, 2022

(30) Foreign Application Priority Data

Oct. 26, 2020   (KR) .................... 10-2020-0139459

(51) Int. Cl.
*B60K 35/00* (2006.01)
*G08G 1/16* (2006.01)

(52) U.S. Cl.
CPC ............... *B60K 35/00* (2013.01); *G08G 1/16* (2013.01); *B60K 2370/148* (2019.05); *B60K 2370/152* (2019.05); *B60K 2370/157* (2019.05); *B60K 2370/158* (2019.05); *B60K 2370/178* (2019.05)

(58) Field of Classification Search
CPC .............. B60K 35/00; B60K 2370/158; B60K 2370/152; B60K 2370/178; B60K 2370/148; B60K 2370/157; G08G 1/16
See application file for complete search history.

(56) References Cited

U.S. PATENT DOCUMENTS

| 2004/0001019 | A1* | 1/2004 | Nakazawa | G01S 13/87 342/70 |
| 2004/0066941 | A1* | 4/2004 | Amada | G01S 3/8083 381/98 |
| 2007/0206849 | A1* | 9/2007 | Sakata | G06V 10/811 382/104 |
| 2009/0243880 | A1* | 10/2009 | Kiuchi | G08G 1/166 342/107 |
| 2010/0060441 | A1* | 3/2010 | Iwamoto | B60W 50/14 340/435 |
| 2012/0032791 | A1* | 2/2012 | Horikawa | G01S 7/52 340/435 |

(Continued)

FOREIGN PATENT DOCUMENTS

JP   2006182324 A  *  7/2006

*Primary Examiner* — Chico A Foxx
(74) *Attorney, Agent, or Firm* — Slater Matsil, LLP

(57) ABSTRACT

An embodiment vehicle includes a display configured to output visual type alarm information, a sound output device configured to output audible type alarm information, a vibration generator mounted in a driver's seat and configured to output haptic-type alarm information by generating vibration, a sound input device configured to receive a sound, and a controller configured to determine whether a driver is in an utterance state based on sound information about the sound received by the sound input device, determine a visual type and a haptic-type as an alarm type when it is determined that the driver is in the utterance state, and determine a visual type, a haptic-type, and an audible type as the alarm type when it is determined that the driver is not in the utterance state.

21 Claims, 4 Drawing Sheets

(56) References Cited

U.S. PATENT DOCUMENTS

| | | | | |
|---|---|---|---|---|
| 2013/0021476 A1* | 1/2013 | Trummer | B60R 22/48 | 348/148 |
| 2015/0197283 A1* | 7/2015 | Marti | G01C 21/3652 | 701/41 |
| 2015/0294547 A1* | 10/2015 | Ito | G08B 21/06 | 340/576 |
| 2016/0009175 A1* | 1/2016 | McNew | G01C 21/3652 | 340/438 |
| 2016/0144785 A1* | 5/2016 | Shimizu | B60R 11/02 | 340/435 |
| 2016/0236690 A1* | 8/2016 | Juneja | B60W 50/14 | |
| 2016/0339838 A1* | 11/2016 | Diaz | B60Q 9/00 | |
| 2017/0279957 A1* | 9/2017 | Abramson et al. | H04M 1/6075 | |
| 2017/0316694 A1* | 11/2017 | Ryu | G08G 1/166 | |
| 2017/0341577 A1* | 11/2017 | Pool | B60Q 9/008 | |
| 2018/0268695 A1* | 9/2018 | Agnew | B60K 28/066 | |
| 2019/0009786 A1* | 1/2019 | Liu | B60C 23/02 | |
| 2019/0161091 A1* | 5/2019 | An | B60K 28/06 | |
| 2019/0168771 A1* | 6/2019 | Migneco | B60W 40/08 | |
| 2020/0064444 A1* | 2/2020 | Regani | G01S 7/006 | |
| 2020/0168095 A1* | 5/2020 | Balakrishnan | G08G 1/166 | |
| 2020/0242421 A1* | 7/2020 | Sobhany | G06F 3/011 | |
| 2020/0312063 A1* | 10/2020 | Balakrishnan | G08B 13/19697 | |
| 2020/0342756 A1* | 10/2020 | MacKenzie | G08G 1/16 | |
| 2020/0384916 A1* | 12/2020 | Tanaka | H04R 1/32 | |
| 2020/0398637 A1* | 12/2020 | Chang | G08B 21/22 | |
| 2021/0016789 A1* | 1/2021 | Limbacher | B60W 40/09 | |
| 2021/0053639 A1* | 2/2021 | Kawai | B62J 6/02 | |
| 2021/0138959 A1* | 5/2021 | Soni | G08G 1/16 | |
| 2021/0142802 A1* | 5/2021 | Furuyama | G10L 15/22 | |
| 2021/0188162 A1* | 6/2021 | Yoshizawa | B60W 50/16 | |
| 2021/0284175 A1* | 9/2021 | Mehdi | B60R 16/037 | |
| 2021/0316807 A1* | 10/2021 | Kinuhata | B62J 50/21 | |
| 2022/0153289 A1* | 5/2022 | Muramatsu | B60R 21/00 | |
| 2022/0242439 A1* | 8/2022 | Onozawa | G01S 13/60 | |

* cited by examiner

DRIVER ASSISTANCE SYSTEM AND VEHICLE HAVING THE SAME

CROSS-REFERENCE TO RELATED APPLICATIONS

This application claims the benefit of Korean Patent Application No. 10-2020-0139459, filed on Oct. 26, 2020, which application is hereby incorporated herein by reference.

TECHNICAL FIELD

The present disclosure relates to a driver assistance system and a vehicle having the same.

BACKGROUND

Recently, various advanced driver assistance systems (ADAS) have been developed that transmit driving information of the vehicle to the driver or perform autonomous driving for the driver's convenience in order to prevent accidents caused by the driver error.

As an example, there is a technology that detects obstacles around the vehicle by mounting a distance sensor on the vehicle and warns the driver.

As another example, there is a technology that acquires the distance to another vehicle through the electromagnet mounted on the bumper of the vehicle, determines that it is a collision situation if the acquired distance to another vehicle is within a certain distance, generates magnetic force by supplying power to the electromagnet, and thereby automatically brakes a vehicle in a collision situation.

Despite the driver assistance system for the driver's safety and convenience, the output time, output type, and output level of alarm information to notify the driver of a dangerous situation should also be changed according to the surrounding conditions such as the area of the road, traffic volume, the number of bicycles or pedestrians, and the driver's driving situation and driving environment. That is, it is necessary to change driver assistance technology according to the surrounding situation and driving environment.

SUMMARY

The present disclosure relates to a driver assistance system and a vehicle having the same. Particular embodiments relate to a driver assistance system for controlling the output of an alarm notifying of danger while driving, and a vehicle having the same.

In view of the above, an embodiment of the present disclosure provides a driver assistance system for changing at least one of an output time, an output type, and an output level of alarm information for informing a driver of a dangerous situation in response to a change in a driving environment, and a vehicle having the same.

Another embodiment provides a vehicle that transmits alarm information on the alarm type, alarm level, and alarm time determined according to the driving environment of the vehicle, such as the vehicle external situation and the vehicle internal situation, to the driver assistance system.

In accordance with an embodiment of the present disclosure, a vehicle includes a display configured to output visual type alarm information, a sound output device configured to output audible type alarm information, a vibration generator mounted in a driver's seat and configured to output haptic-type alarm information by generating vibration, a sound input device configured to receive a sound, and a controller configured to determine whether a driver is in an utterance state based on sound information about the sound received by the sound input device, determine a visual type and a haptic-type as an alarm type when it is determined that the driver is in the utterance state, and determine a visual type, a haptic-type, and an audible type as an alarm type when it is determined that the driver is not in the utterance state.

The controller may be configured to determine a reference alarm level as an alarm level when it is determined that the driver is not in an utterance state and determine a first alarm level higher than the reference alarm level as the alarm level when it is determined that the driver is in an utterance state.

The controller may be configured to determine a reference alarm level as an alarm level and store it as primary alarm information when it is determined that the driver is not in an utterance state, and determine a first alarm level higher than the reference alarm level as the alarm level and store it as primary alarm information when it is determined that the driver is in an utterance state.

The controller may be configured to store the first alarm level higher than the reference alarm level as secondary alarm information when it is determined that the driver is in an utterance state, and store a third alarm level higher than a second alarm level as tertiary alarm information.

The controller may further include an alarm type of audible type as the secondary and tertiary alarm information when storing the secondary alarm information and tertiary alarm information.

The controller may be configured to transmit the primary, secondary, and tertiary alarm information to a driver assistance system.

The vehicle may further include an obstacle detector, and the controller may be configured to control to output the primary, secondary and tertiary alarm information based on obstacle information detected by the obstacle detector.

The controller may be configured to store the first alarm level as secondary alarm information when it is determined that the driver is not in an utterance state, and store the second alarm level as tertiary alarm information.

The controller may be configured to determine a reference alarm time as an alarm time and store it as primary alarm information when it is determined that the driver is not in an utterance state, and determine a first alarm time longer than the reference alarm time as an alarm time and store it as primary alarm information when it is determined that the driver is in an utterance state.

The controller may be configured to store a first alarm time longer than a reference alarm time as secondary alarm information when it is determined that the driver is in an utterance state, and store a third alarm time longer than the second alarm time as tertiary alarm information.

The controller may be configured to store the first alarm time as secondary alarm information when it is determined that the driver is not in an utterance state and store the second alarm time as tertiary alarm information.

The controller may be configured to determine whether a function of outputting an audio signal through the sound output device is performed when outputting the audible type alarm information, control a cancellation of the audio signal when it is determined that the function is being performed and output the audible type alarm information through the sound output device.

In accordance with another embodiment of the present disclosure, a vehicle includes a display configured to output visual type alarm information, a sound output device configured to output audible type alarm information, a vibration generator mounted in a driver's seat and configured to output haptic-type alarm information by generating vibration, a sound input device configured to receive a sound, an occupant detector configured to detect an occupant and output occupant information on the detected occupant, and a controller configured to determine a visual type and a haptic-type as an alarm type when it is determined that there are two occupants or more based on the occupant information and determine a visual type, a haptic-type, and an audible type as an alarm type when it is determined that there is one occupant based on the occupant information.

The controller may be configured to acquire location information of a talker based on sound information about the sound received by the sound input device, determine whether a driver is the talker based on the acquired location information of the talker, determine an alarm level of the determined alarm type as a reference alarm level when it is determined that the driver is not the talker, and determine an alarm level of the determined alarm type as an alarm level higher than the reference alarm level when it is determined that the driver is the talker.

The controller may be configured to acquire location information of a talker based on sound information about the sound received by the sound input device, determine whether a driver is the talker based on the acquired location information of the talker, determine an alarm time of the determined alarm type as a reference alarm time when it is determined that the driver is not the talker, and determine an alarm time of the determined alarm type as an alarm time higher than the reference alarm time when it is determined that the driver is the talker.

The controller may be configured to acquire location information of a talker based on sound information about the sound received by the sound input device, determine whether a driver is the talker based on the acquired location information of the talker, determine an alarm period of the determined alarm type as a reference alarm period when it is determined that the driver is not the talker, and determine an alarm period of the determined alarm type as an alarm period less than the reference alarm period when it is determined that the driver is the talker.

The controller may be configured to determine whether a function of outputting an audio signal through the sound output device is performed when outputting the audible type alarm information, control a cancellation of the audio signal when it is determined that the function is being performed and output the audible type alarm information through the sound output device.

The controller may be configured to transmit the determined alarm information to a driver assistance system.

In accordance with another embodiment of the present disclosure, a driver assistance system includes a display configured to output visual type alarm information, a sound output device configured to output audible type alarm information, a vibration generator mounted in a driver's seat and configured to output haptic-type alarm information by generating vibration, and a controller configured to determine whether an occupant is two or more and a driver is a talker based on sound information in the vehicle and occupant information in the vehicle, determine a visual type, a haptic-type, and an audible type as an alarm type when it is determined that the occupant is one and the driver is not the talker, determine a visual type and a haptic-type as an alarm type when it is determined that the occupant is two or more or the driver is the talker, and control an output of alarm information based on the determined alarm type.

The controller may be configured to determine a reference alarm level, a reference alarm time, and a reference alarm period as alarm information when it is determined that the occupant is one and the driver is not the talker, and determine an alarm level higher than the reference alarm level, an alarm time longer than the reference alarm time, and an alarm period shorter than the reference alarm period as alarm information when it is determined that the occupant is two or more or the driver is a talker.

The driver assistance system may further include an obstacle detector, and the controller may be configured to control to output the determined alarm information based on obstacle information detected by the obstacle detector.

BRIEF DESCRIPTION OF THE DRAWINGS

These and/or other aspects of embodiments of the disclosure will become apparent and more readily appreciated from the following description of the exemplary embodiments, taken in conjunction with the accompanying drawings, in which.

DETAILED DESCRIPTION OF ILLUSTRATIVE EMBODIMENTS

Figure 1:
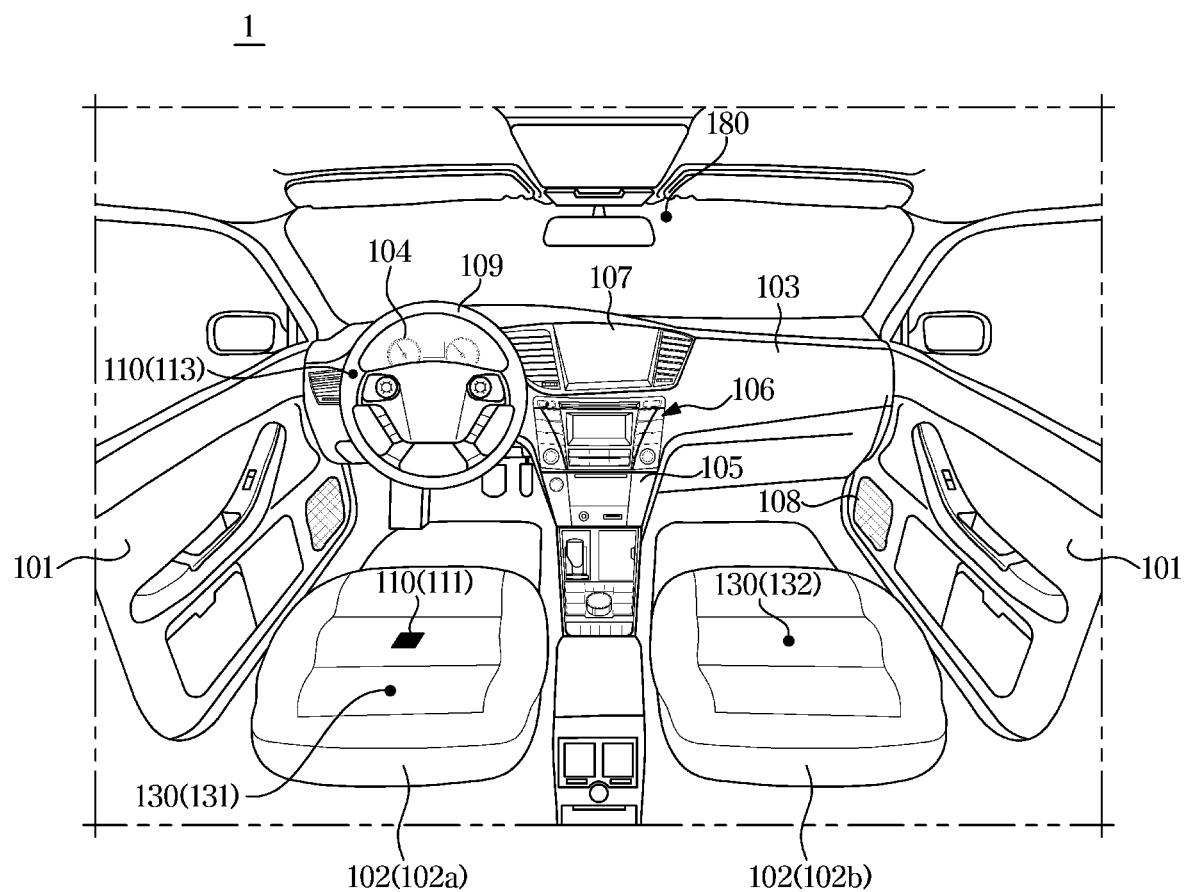
FIG. 1 is an exemplary view showing the interior of a vehicle according to an embodiment.

The same reference numerals refer to the same elements throughout the specification. This specification does not describe all elements of the exemplary embodiments of the present disclosure and detailed descriptions on what are well known in the art or redundant descriptions on substantially the same configurations may be omitted. The term 'part, module, member, block' used in the specification may be implemented in software or hardware, and a plurality of 'parts, modules, members, blocks' may be embodied as one component. It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network.

In addition, when a part is said to "include" a certain component, this means that it may further include other components, except to exclude other components unless otherwise stated.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and embodiments of the present disclosure.

Figure 2:
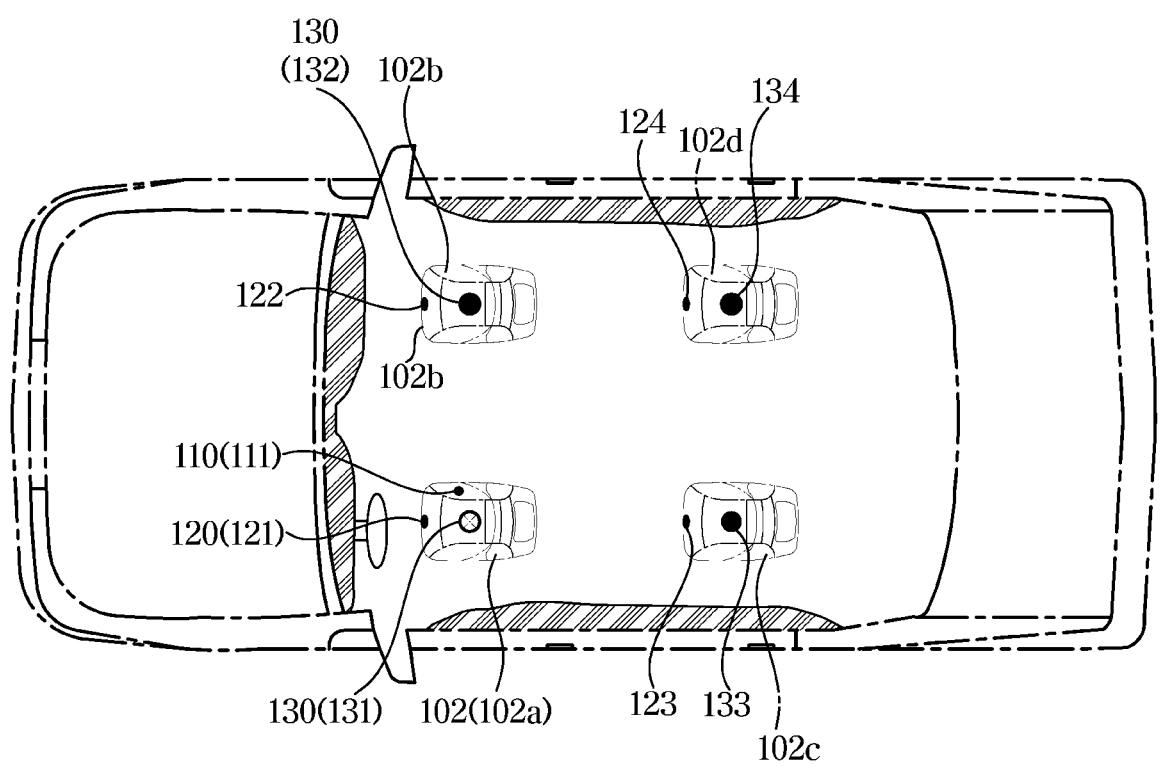
FIG. 2 is an exemplary view of a seat mounted in a vehicle according to an embodiment.

FIG. 1 is an exemplary view showing the interior of a vehicle according to an embodiment. FIG. 2 is an exemplary view of a seat mounted in a vehicle according to an embodiment.

The vehicle 1 includes a body having an interior and an exterior, and a chassis corresponding to the rest of the vehicle body and on which a mechanical device necessary for driving is mounted.

The exterior of the vehicle body includes a front panel, a bonnet, a roof panel, a rear panel, a trunk in which luggage is loaded, a front/rear/left/right door 101, and a window glass provided to be opened and closed on the front/rear/left/right door.

As shown in FIG. 1, the interior of the vehicle body may include a seat 102 (102a, 102b) on which the occupant sits, a dashboard 103, a cluster (i.e., instrument panel) 104 disposed on the dashboard and guiding vehicle information and driving functions such as vehicle speed, engine speed, fuel flow, and coolant, and a center fascia 105 provided with a control panel of the air conditioner.

As shown in FIG. 2, the seat 102 is a chair on which an occupant can sit, and includes a driver's seat 102a on which the driver sits, and a passenger seat 102b provided next to the driver's seat and on which the occupant sits, and may further include a rear seat provided at the rear of the driver's seat and the passenger seat and on which the occupant can sit.

The rear seat may include a first rear seat 102c behind the driver's seat and a second rear seat 102d behind the passenger seat, and may further include a third rear seat provided between the first and second rear seats.

Among the seats, the driver's seat 102a may be provided with a first vibration generator 110 (111) that generates vibration. At this time, the vibration generated by the first vibration generator nil may be transmitted to the driver's seat.

A second vibration generator 110 (112 in FIG. 3) for generating vibration may be provided on a seat belt provided in the driver's seat 102a among the seats. At this time, the vibration generated by the second vibration generator 112 may be transmitted to the seat belt of the driver's seat.

Only the first vibration generator or the second vibration generator may be provided in the vehicle. In addition, it is also possible to provide both the first and second vibration generators in the vehicle.

Each seat may further include an occupant detector 130 (131, 132, 133, 134) that detects the presence of an occupant and outputs occupant information.

The occupant detector 130 may be a belt attachment/detachment detector that detects attachment/detachment of seat belts provided on a plurality of seats inside the vehicle.

The occupant detector 130 may be a weight detector that is provided on each of a plurality of seats inside the vehicle and detects a weight applied to the seat.

The vehicle may include a head unit 106 provided in the center fascia and for controlling an audio device, an air conditioner, a Bluetooth device, and a heating wire of the seat.

The head unit 106 may include an input device 106a for receiving a user input and a display 106b for displaying various types of information.

The input device 106a may include hardware devices such as various buttons, switches, pedals, keyboards, mouse, track-balls, various levers, handles or sticks.

In addition, the input device 106a may include a Graphical User Interface (GUI) such as a touch pad or a touch panel, that is, a software device.

The input device 106a may be provided on the head unit or the center fascia. The input device provided in the head unit or the center fascia is described as the first input device.

The display 106b may be provided on the head unit or the center fascia. The display provided on the head unit or center fascia is described as the first display.

The display 106b may include a display panel.

The display panel may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel, or an organic light emitting diode (OLED) panel, but is not limited thereto.

The vehicle may further include a vehicle terminal 107 that displays an image for an audio function, a video function, and a navigation function, and receives a user input for an audio function, a video function, and a navigation function.

The vehicle terminal 107 may receive a user command and display operation information of various functions or operation information of various electronic devices.

The vehicle terminal 107 may include a display and may further include an input device.

The touch panel of the input device provided in the vehicle terminal 107 and the display panel of the display may be implemented as a touch screen panel (TSP). That is, the touch panel of the input device provided in the vehicle terminal 107 may form a layer structure with the display panel of the display. In this case, the touch panel and the display panel may have the same shape and the same size as each other, and location information of the touch panel and location information of the display panel may be identically matched to each other.

The input device provided in the vehicle terminal 107 is described as a second input device, and the display provided in the vehicle terminal 107 is described as a second display.

The vehicle terminal 107 may further perform at least one of a broadcasting function (DMB function), a radio function, an audio function, a content playback function, a call function, and an Internet search function.

The vehicle may further include a sound output device 108 that outputs a sound corresponding to a function being performed by the vehicle. The sound output device 108 may interlock with the vehicle terminal 107 to output a sound for a function being performed by the vehicle terminal 107.

The sound output device 108 may include a speaker provided in the vehicle, and may include a speaker provided in the vehicle terminal 107.

The speaker converts the amplified low-frequency audio signal into an original sound wave, generates a longitudinal wave in the air, and radiates the sound wave, thereby outputting the audio data as sound that the user can hear.

The sound output device 108 may include an amplifier that amplifies and outputs a compensation signal generated by the controller 150. The amplifier converts the sound from digital to analog, amplifies it, and outputs it through a speaker.

The sound output device 108 may include one or a plurality of speakers.

When a plurality of speakers are provided, some of the speakers may be provided on the first A pillar disposed between the left front door and the front windshield, and the second A pillar disposed between the right front door and the front windshield.

Some speakers may be provided inside the driver's seat door and inside the passenger door, and the remaining speakers may be provided inside the left and right doors of the rear seat, respectively.

The remaining speakers may be provided in the first B pillar disposed between the left front door and the left rear door, and the second B pillar disposed between the right front door and the right rear door, respectively.

The remaining speakers may be provided in the rear left first fender and the rear right second fender, respectively.

The vehicle 1 may include a steering wheel 109 of a steering unit for adjusting the driving direction, a brake pedal pressed by the user according to the user's braking will, and an accelerator pedal pressed by the user according to the user's will to accelerate.

A lighting device, an air conditioner, a seat heating wire, a steering wheel heating wire, a seat ventilation device, an audio device, and a radio device may be selectively provided in the vehicle as a convenience device.

The steering wheel 109 may be provided with a third vibration generator (113 in FIG. 3) that generates vibration. In this case, the vibration generated by the third vibration generator 113 may be transmitted to the steering wheel 109.

The third vibration generator 113 may include a vibration motor.

The third vibration generator 113 includes motor driven power steering (MDPS), and it is also possible to generate vibration through the control of the MDPS.

The vehicle may further include a sound input device 120 for receiving internal sound.

The sound input device 120 may further include one or more microphones.

The sound input device 120 may also include a micro array.

As shown in FIG. 2, the sound input device 120 may be provided on a plurality of seats 102*a*, 102*b*, 102*c*, and 102*d*, respectively.

For example, when four seats are provided in the vehicle, the sound input device 120 may include a first sound input device 121, a second sound input device 122, a third sound input device 123 and a fourth sound input device 124 provided on the plurality of seats 102*a*, 102*b*, 102*c*, and 102*d*, respectively.

The vehicle may further include an image acquisition device 180 for acquiring an image of a road environment. The vehicle may further include an image acquisition device 180 for acquiring an image of the interior.

Figure 3:
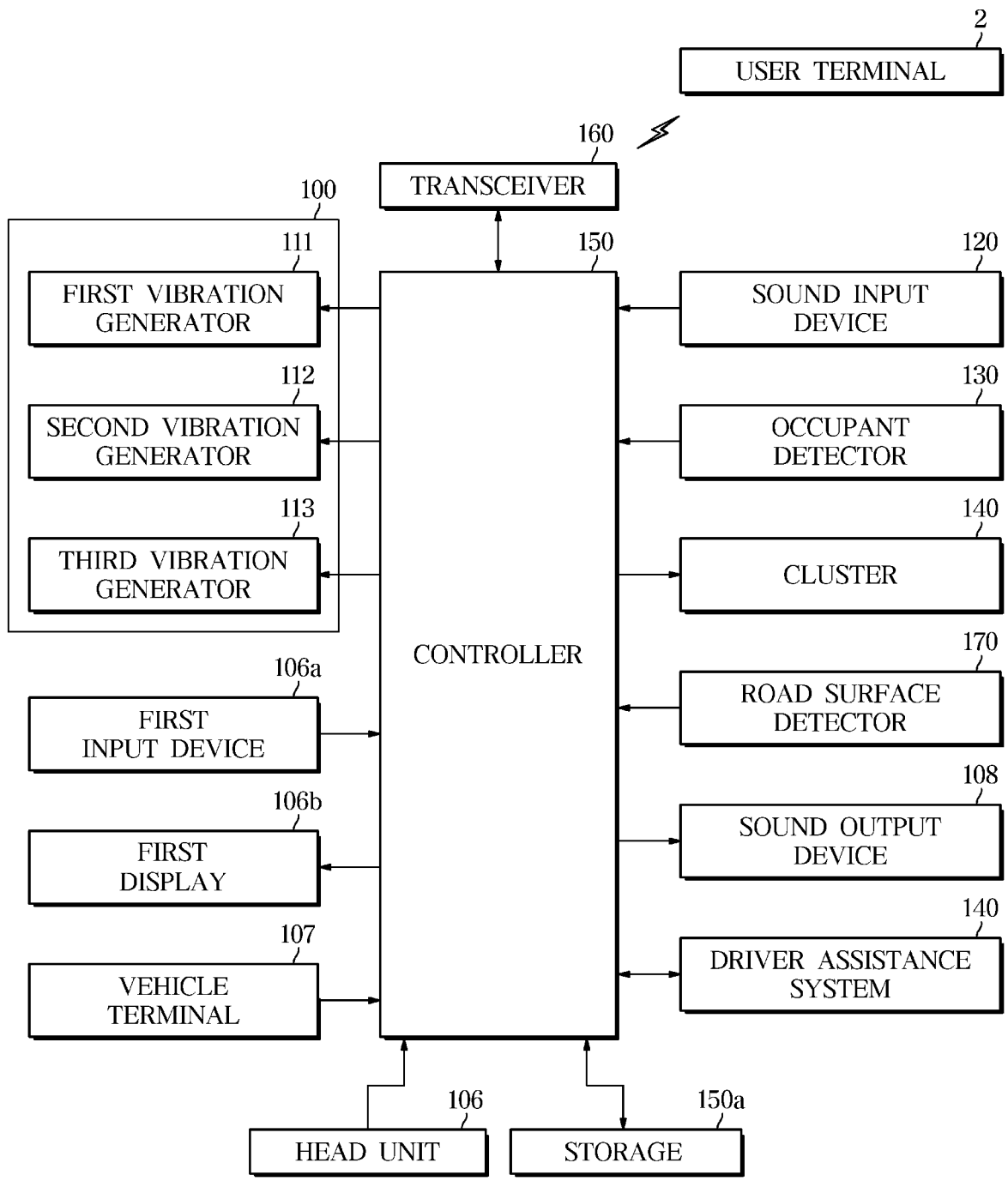
FIG. 3 is a control configuration diagram of a vehicle according to an embodiment.
Figure 4:
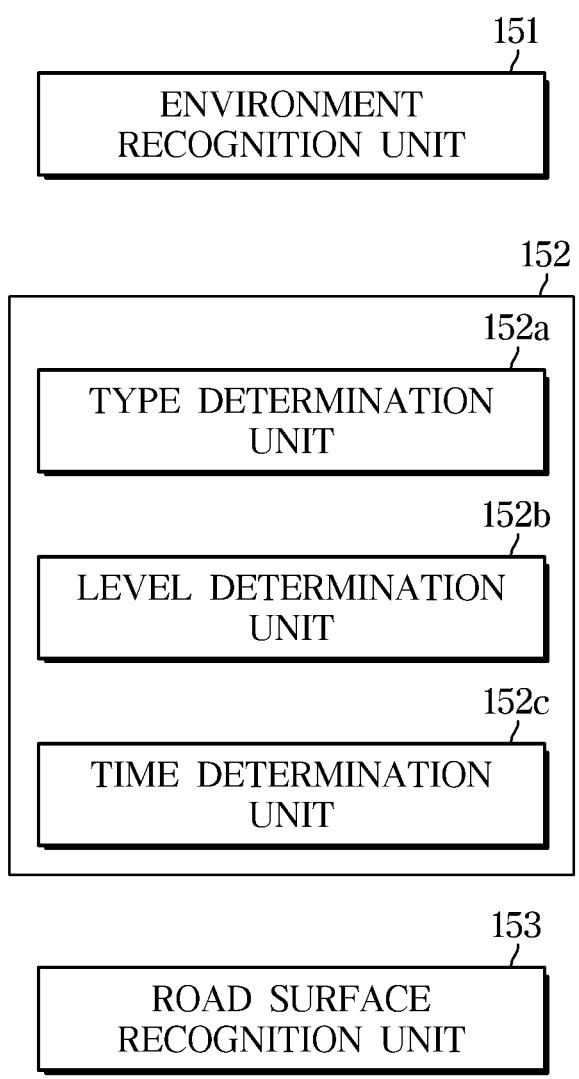
FIG. 4 is a detailed configuration diagram of a controller of a vehicle according to an embodiment.

FIG. 3 is a control configuration diagram of a vehicle according to an embodiment. FIG. 4 is a detailed configuration diagram of a controller of a vehicle according to an embodiment.

The vehicle includes a cluster 104, a first input device 106*a*, a first display 106*b*, a head unit 106, a vehicle terminal 107, a sound output device 108, a vibration generator 110, a sound input device 120, an occupant detector 130, a driver assistance system 140, a controller 150, a storage 150*a*, and a transceiver 160, and further includes a road surface detector 170 and an image acquisition device 180 (see FIG. 2), and may further include a driving information detector (not shown) and an obstacle detector (not shown).

Descriptions of the configurations described through FIGS. 1 and 2 will be omitted.

The cluster 104, the first display 106*b*, the vehicle terminal 107, and the head unit 106 may display alarm information on a dangerous situation in response to a control command of the controller 150.

For example, the cluster 104 may change and display color information of a lamp provided in the cluster, displayed image information, and blinking information of a lamp. Here, the blinking information may include a blinking interval, a total blinking time, and the like.

The second display of the vehicle terminal 107 may change color information or display an image corresponding to an alarm.

The second display of the vehicle terminal 107 may display map information, and also possibly display map information and directions information in which the route to the destination is matched.

The second display of the vehicle terminal 107 may display an autonomous driving mode or a manual driving mode, and may display on-off information of the collision avoidance notification mode.

The second display of the vehicle terminal 107 may display collision risk information indicating a collision with an obstacle as an image.

The second display of the vehicle terminal 107 may display deceleration information and steering information for obstacle avoidance as an image.

The first input device 106*a*, the vehicle terminal 107, and the head unit 106 may receive an operation command, a stop command, a function adjustment command, and the like such as a radio function, an audio function, a call function, a communication function with a user terminal and a navigation function.

The first input device 106*a*, the vehicle terminal 107, and the head unit 106 may receive boarding information regarding whether the occupant is boarding and the boarding position as a user input.

The first input device 106*a* may be an input device provided in the head unit, but may be an input device provided in a steering wheel, a center fascia, a lever, a door, or the like.

The first input device 106*a* and the vehicle terminal 107 receive either a manual driving mode in which the driver directly drives the vehicle or an autonomous driving mode. The input signal is transmitted to the controller 150.

The first input device 106*a* and the vehicle terminal 107 may receive destination information while performing an autonomous driving mode or a navigation mode, and may receive information on a route for at least one of a plurality of routes.

The first input device 106*a* and the vehicle terminal 107 may receive an input of a target driving speed in the autonomous driving mode.

The sound output device 108 outputs a sound in response to a control command of the controller 150, and outputs a sound corresponding to a function being performed in the vehicle.

The sound output device 108 may output a sound for canceling noise in response to a control command of the controller 150.

The sound output device 108 outputs sound in response to the control command of the controller 150, and may output sound at a level corresponding to the control command of the controller 150, and may output a type of sound corresponding to a control command of the controller 150 as sound.

The vibration generator 11*o* generates vibration in response to a control command of the controller 150.

The sound input device 120 receives sound inside the vehicle while driving.

The sound input device 120 may receive a sound inside the vehicle, that is, a sound for a user's voice while performing a call function.

The occupant detector 130 may transmit seating information (i.e., boarding information) regarding the presence or absence of an occupant to the controller 150.

The driver assistance system 140 assists the driver in operating (driving, braking, steering) the vehicle 1.

The driver assistance system 140 includes a road surface detector 170, an image acquisition device 180, a driving information detector (not shown), an obstacle detector (not shown), and a location receiver, or receives various information by communicating with a road surface detector 170, an image acquisition device 18o, a driving information detector (not shown), an obstacle detector (not shown) and a location receiver provided in the vehicle, and may assist driving by using various types of received information.

The location receiver receives location information of the host vehicle, and may include a Global Positioning System (GPS) receiver that calculates the location of the host vehicle by performing communication with a plurality of satellites.

For example, the driver assistance system 140 may detect obstacles around the vehicle 1 (e.g., other vehicles, pedestrians, cyclists, lanes, road signs, etc.) and may control driving and/or braking and/or steering of the vehicle 1 in response to obstacle information on the detected obstacle.

The driver assistance system 140 may provide the driver with a lane departure warning (LDW) function, a lane keeping assist (LKA) function, an autonomous emergency braking (AEB) function, a traffic sign recognition (TSR) function, a smart cruise control (SCC) function, a blind spot detection (BSD) function, or the like.

The driver assistance system 140 may include a collision avoidance device that outputs notification information about a collision with an obstacle or avoids an obstacle in order to prevent a collision with an obstacle.

The driver assistance system 140 provides an autonomous driving control device that automatically drives to a destination by controlling the driving of the vehicle according to the planned driving route while avoiding the obstacles, determining the obstacles and driving conditions by the vehicle itself.

The autonomous driving device may control the driving to the destination autonomously, and controls to drive at the target driving speed, perform image processing on the image information acquired by the image acquisition device 180 when performing autonomous driving to recognize lanes and obstacles on the road, recognize an own lane on which the host vehicle travels based on the recognized location information of the lane, acquire the distance to the recognized obstacle based on the obstacle information detected by the obstacle detector and control lane change, acceleration, deceleration and steering based on the acquired distance to the obstacle.

The above-mentioned electronic components may communicate with each other through a vehicle communication network (NT). For example, the electronic components may perform data communication through Ethernet, media oriented systems transport (MOST), a FlexRay, a controller area network (CAN), a local interconnect network (LIN), or the like.

The controller 150 may check the occupant's boarding location based on the occupant information detected through the occupant detector 130 and store boarding location information for the confirmed boarding location.

The controller 150 may activate the operation of the sound input device and the sound output device based on the boarding location information.

When an image acquisition device for acquiring an image inside the vehicle is provided, the controller 150 may acquire boarding location information of the occupant based on the image information on the image inside the vehicle acquired by the image acquisition device.

The controller 150 checks the functions performed by the head unit 106 and the vehicle terminal 107 and acquires the driver's state based on information on the confirmed functions.

The controller 150 may determine whether the driver is in an utterance state, a listening state, a viewing state, or a driving concentration state based on function information on a function being performed in the vehicle.

Functions performed by the head unit 106 may include an audio function, a radio function, a call function (hands-free function), and a voice recognition function.

Functions performed in the vehicle terminal 107 may include an audio function, a radio function, a content playback function, a broadcasting function, a call function, an internet function, a search function, a navigation function, and the like.

In addition, the sound output through the sound output device by an audio function, a radio function, a content playback function, a broadcasting function, a call function, an internet function, a search function, and a navigation function is described as an audio signal.

The controller 150 may determine whether the driver assistance system 140 is operating based on the first input device 106a, the second input device of the vehicle terminal 107, and the input information received through the head unit 106.

For example, the controller 150 may determine an on-off state of the smart cruise control (SCC) function, an on-off state of blind spot detection (BSD), and an on-off state of lane departure warning (LDW).

The controller 150 may perform communication with the driver assistance system 140 to determine whether the driver assistance system 140 is operating.

The controller 150 may check the functions performed by the head unit 106 and the vehicle terminal 107, check the output information output through the head unit 106 and the vehicle terminal 107 by performing the identified function, determine whether sound information exists among the checked output information, and check an output level of sound based on the sound information when it is determined that sound information exists.

The controller 150 may check the output level of sound that occupants can hear in the vehicle based on sound information about the sound input through the sound input device 120.

The controller 150 determines whether the environment in the vehicle is in a conversation state based on sound information input through the sound input device 120 and function information on functions performed by the head unit 106 and the vehicle terminal 107.

The controller 150 may determine whether the environment in the vehicle is in a conversation state based on the sound input through the sound input device 120.

The controller 150 may check the boarding location of the talker having a conversation based on sound information about the sound input through the sound input device 120.

The controller 150 may check the boarding location of the occupant (i.e., the talker) in conversation based on the occupant information detected by the occupant detector and the sound information input through the sound input device 120.

The controller 150 firstly checks the location of the occupant (i.e., the talker) in conversation based on the sound information input through the sound input device 120, and may secondly check the location of an occupant (i.e., a talker) in conversation based on the location information of the occupant in conversation, which was firstly checked and the location information of the occupant detected by the occupant detector.

The controller 150 may determine whether a driver is included in the occupant in conversation based on location information of the occupant in conversation.

For example, the controller 150 may determine whether it is a conversation between the driver and the occupant in the passenger seat, whether it is a conversation between the driver and the occupant in the first or second rear seat, whether it is a conversation between the occupant of the passenger seat and the occupant of the first or second rear seat, or whether it is a conversation between the occupants of the first and second rear seats. In addition, the controller 150 may determine whether the driver is included in the occupants in conversation based on the determination result.

The configuration for determining whether a driver is included in the conversation occupants will be described in more detail.

The controller 150 may acquire only a voice signal for an occupant's voice by removing an audio signal and noise among sound signals input through a sound input device using a noise canceling algorithm. In addition, the controller 150 may check the sound input device from which the acquired voice signal is received, and acquire location information of the occupant in conversation based on the location information of the checked sound input device.

The controller 150 may acquire location information of an occupant in conversation based on the level of the voice loudness among voice signals input to each sound input device.

For example, when the driver speaks, the level of the voice loudness of the voice signal input through the sound input device provided in the driver's seat may be the largest, the level of the voice loudness of the voice signal input through the sound input device provided in the passenger seat may be the second largest, the level of the voice loudness of the voice signal input through the sound input device provided in the first rear seat may be the third largest, and the level of the voice loudness of the voice signal input through the sound input device provided in the second rear seat may be the smallest.

When the occupant of the passenger seat speaks, the level of the voice loudness of the voice signal input through the sound input device provided in the passenger seat may be the largest, the level of the voice loudness of the voice signal input through the sound input device provided in the driver's seat may be the second largest, the level of the voice loudness of the voice signal input through the sound input device provided in the second rear seat may be the third largest, and the level of the voice loudness of the voice signal input through the sound input device provided in the first rear seat may be the smallest.

When the occupant of the first rear seat speaks, the level of the voice loudness of the voice signal input through the sound input device provided in the first rear seat may be the largest, the level of the voice loudness of the voice signal input through the sound input device provided in the second rear seat may be the second largest, the level of the voice loudness of the voice signal input through the sound input device provided in the driver's seat may be the third largest, and the level of the voice loudness of the voice signal input through the sound input device provided in the passenger seat may be the smallest.

When the occupant speaks in the second rear seat, the level of the voice loudness of the voice signal input through the sound input device provided in the second rear seat may be the largest, the level of the voice loudness of the voice signal input through the sound input device provided in the first rear seat may be the second largest, the level of the voice loudness of the voice signal input through the sound input device provided in the passenger seat may be the third largest, and the level of the voice loudness of the voice signal input through the sound input device provided in the driver's seat may be the smallest.

The controller 150 may acquire location information of an occupant in conversation based on location information of the sound input device having a high level of the voice loudness.

The controller 150 may acquire location information of an occupant in conversation based on the voice frequency band of the acquired voice signal.

The controller 150 may determine whether the driver has a conversation (i.e., whether or not to speak) based on the level and frequency of the voice loudness input by the plurality of sound input devices.

The controller 150 may determine whether the driver speaks in response to whether or not the call function is executed.

When it is determined that the driver is in the utterance state and an occupant exists in the passenger seat, the controller 150 may determine the visual type and haptic-type as the alarm type, determine a first level higher than the reference level as the alarm level, determine the alarm time as a first alarm time longer than the reference alarm time, and store the determined alarm type, alarm level, and alarm time as primary alarm information.

The utterance state may include a conversation state with another occupant and a call state.

When it is determined that the driver is in the utterance state and an occupant exists in the passenger seat, the controller 150 may determine the audible type, visual type and haptic-type as the alarm type, determine a second level higher than the first level as the alarm level, determine the alarm time as a second alarm time longer than the first alarm time, and store the determined alarm type, alarm level, and alarm time as secondary alarm information.

When it is determined that the driver is in the utterance state and an occupant exists in the passenger seat, the controller 150 may determine the audible type, visual type and haptic-type as the alarm type, determine a fourth level higher than the second level as the alarm level, determine the alarm time as a third alarm time longer than the second alarm time, and store the determined alarm type, alarm level, and alarm time as tertiary alarm information.

For example, the controller 150 outputs primary alarm information if the distance to the obstacle is a first distance, outputs secondary alarm information if the distance to the obstacle is a second distance closer than the first distance and outputs tertiary alarm information if the distance is a third distance closer than the second distance.

As another example, the controller 150 outputs primary alarm information if the predicted collision time with an obstacle is the first time, outputs secondary alarm information if the predicted collision time with the obstacle is a second time shorter than the first time and outputs tertiary alarm information if the predicted collision time with the obstacle is a third time shorter than the second time.

When it is determined that the driver is not in the utterance state and there is no occupant in the passenger seat, the controller 150 may determine the audible type, visual type and haptic-type as the alarm type, determine the alarm level as the reference level, and determine the alarm time as the reference time. In addition, the controller 150 may store the determined alarm type, alarm level, and alarm time as primary alarm information, and may store secondary alarm information and tertiary alarm information by increasing the alarm level and increasing the alarm time.

When it is determined that the driver is in the call state and there is no occupant in the passenger seat, the controller 150 may determine the audible type, visual type and haptic-type as the alarm type, determine the alarm level as the first level, and determine the alarm time as the first alarm time. In addition, the controller 150 may store the determined alarm type, alarm level, and alarm time as primary alarm information, and may store secondary alarm information and tertiary alarm information by increasing the alarm level and increasing the alarm time.

When controlling the output of tertiary alarm information, the controller 150 determines whether the driver is in a driving concentration state, and when it is determined that the driver is in a driving concentration state, adjusts an alarm level and an alarm time.

When it is determined that the driver is in the driving concentration state, the controller 150 may reduce the display intensity of an image corresponding to an alarm stage for the display state of the display, and may stop the output of alarm information when an alarm is released.

If it is determined that only the driver in the vehicle exists and the interior noise level is the reference noise level or less, the controller may determine the alarm type as visual type and audible type. If it is determined that only the driver in the vehicle exists and the interior noise level exceeds the reference noise level, the controller may determine the alarm type as haptic-type and audible type.

If it is determined that only the driver in the vehicle exists and the interior noise level is the reference noise level or less, the controller can determine secondary alarm information and tertiary alarm information by adjusting only the haptic-type alarm level.

If it is determined that only the driver in the vehicle exists and the interior noise level exceeds the reference noise level, the controller may determine secondary alarm information and tertiary alarm information by adjusting only the audible type alarm level.

If there are the driver and the occupant in the passenger seat in the vehicle, the controller may determine secondary alarm information by adjusting the haptic-type alarm level, and determine tertiary alarm information by adjusting the audible type alarm level.

The controller 150 determines the alarm information based on the location information of the occupant, the location information of the occupant in conversation, and the level of the audio signal. The controller 150 controls the operation of at least one of a cluster, a first display, a vehicle terminal, a sound output device, and a vibration generator based on the determined alarm information.

Here, the alarm information may include an alarm type, an alarm level, and an alarm time, and may further include an alarm period.

The alarm type may include a visual type such as video display and lamp lighting, an audible type such as a siren, and a haptic-type such as vibration.

The alarm level may include a brightness level of a color, a saturation level of a color, a blinking brightness level of a lamp, a blinking time interval level, a vibration intensity level, and a sound volume level.

The alarm time is the time when alarm information is output, and the alarm period is the time interval at which alarm information is output.

The controller 150 may temporarily stop the output of an audio signal to be output through the sound output device 108 when it is determined that the alarm information is output time.

The controller 150 may generate a cancellation signal for canceling an audio signal to be output through the sound output device 108 and output the generated cancellation signal through the sound output device 108. Through this, only alarm information may be output through the sound output device 108, or only sound for alarm information may be heard by the occupant.

When a sound signal corresponding to the sound input through the sound input device 120 is received, the controller 150 may recognize a noise signal for noise among the sound signals, generate an antiphase signal of the recognized noise signal and output the generated antiphase signal as a noise cancellation signal.

The noise signal may be a signal for noise generated by external noise of the vehicle and vibration of the vehicle, such as a rain sound and a sound generated by driving of another vehicle.

The noise signal may be a signal excluding an audio signal corresponding to a function performance and an audio signal for an occupant's voice.

The controller 150 may select at least one of a plurality of sound output devices based on location information of the occupant and output a noise control signal generated through the selected sound output device 108.

The controller 150 may mix a noise control signal with a sound source (i.e., an audio signal) to be output through a head unit or a vehicle terminal, and then output through a speaker of at least one selected sound output device.

In this case, the phase of the noise signal generated interior of the vehicle 1 and the phase of the audio signal mixed with the noise control signal may be opposite to each other. Due to this, noise signals generated interior may be attenuated. Thus, noise in the vehicle can be reduced or eliminated.

The controller 150 may transmit alarm information on the determined alarm type, alarm level, and alarm time to the driver assistance system. Accordingly, the driver assistance system can control the alarm output based on alarm information on the received alarm type, alarm level, and alarm time.

For example, when it is determined that an obstacle exists in the blind spot, the blind spot detection (BSD) device may output an alarm for collision with an obstacle with the received alarm level, alarm type, and alarm time based on the received alarm information.

The controller 150 may check the level of the audio signal output through the sound output device and adjust the alarm level based on the sound output level of the checked audio signal.

The controller 150 may adjust the alarm level based on whether the driver speaks and the sound output level of an audio signal for a function being performed in the vehicle.

Here, the alarm level may include a loudness level of a sound and an intensity level of a vibration.

The controller 150 may gradually increase the alarm level when only the driver exists and the noise level is the reference noise level or less.

If only the driver exists and the noise level is the reference noise level or less, the controller 150 may gradually increase the alarm level in response to the risk.

The controller 150 may control the output of audible type alarm information when only the driver exists.

The controller 150 can reduce the inconvenience of the occupant of the passenger seat by limiting the output of the audible type alarm information when the occupant exists in the passenger seat.

The controller 150 may determine an alarm type as a visual type and a haptic-type during a call function, a content playback function, or a broadcasting function, and may add an audible type when a secondary alarm is performed.

The controller 150 may determine an alarm type as a visual type and a haptic-type when a call function is being performed, and may add an audible type when a secondary alarm is performed.

The vehicle may further include a road surface detector 170, a rain detector, and an image acquisition device.

The road surface detector 170 may include a wheel speed sensor and an acceleration sensor.

The wheel speed sensor and acceleration sensor may be sensors provided in an electronic controlled suspension (ECS) or electronic stability control (ESC) system.

The vehicle may further include a rain detector for detecting rain.

The vehicle may recognize the road surface and recognize whether there is rain based on the image of the road acquired by the image acquisition device.

The controller 150 may recognize the road surface based on the road surface information detected by the road surface detector 170, recognize an external environment based on road surface information on the recognized road surface and lane information detected through a lane detector, and determine alarm information based on the recognized external environment.

When the road surface detector 170 is an acceleration sensor, the controller 150 may acquire a reference signal based on the acceleration signal detected by the acceleration sensor, generate an antiphase signal (i.e., a noise control signal) for removing noise for the acquired reference signal, and output a sound corresponding to the generated noise control signal through the sound output device 108.

The controller 150 may recognize vibrations that cause interior noise based on the acceleration signal detected by the acceleration sensor in advance.

The controller 150 recognizes the direction in which the sound was collected, acquires location information of the occupant who spoke based on the recognized direction, and performs voice recognition based on the sound.

The controller 150 may communicate with the driver assistance system and transmit alarm information to the driver assistance system.

The controller 150 may transmit alarm information to a smart cruise control (SCC), blind spot detection (BSD) and lane departure warning (LDW) requiring alarm information.

The image acquisition device 180 acquires an image of a road and transmits information of the acquired image to the controller 150. Here, the image information may be image data.

The image acquisition device 180 may include a front camera, acquire image information of a road from front image data captured by the front camera, and acquire a shape of an obstacle.

The image acquisition device 180 may be provided inside the vehicle to acquire an image of an occupant boarding the vehicle.

In this way, the image acquisition device 180 provided inside the vehicle may be used as an occupant detector.

The environment recognition unit 151 may be an internal environment recognition unit that recognizes an environment inside a vehicle.

As an external environment recognition unit for recognizing an external environment, a road surface recognition unit may further be included, and a rain detector for detecting rain may be further included.

The controller may receive road environment and ambient noise information and adjust the output level of the sound and haptic intensity when the road surface roughness and noise increase. For example, the controller can raise the output level of the sound and the level of vibration on rough road surfaces.

The controller may receive road environment and ambient noise information and change a lamp color of a cluster, an alarm image of a first display or a display of a vehicle terminal, or a background color when road roughness and noise increase.

The controller can also adjust the alarm sound and vibration intensity according to the transition request time when the control right in the autonomous driving mode is transitioned. At this time, an alarm sound and vibration may be generated at a time set by the user.

The controller can also adjust the alarm sound and vibration generation time and period when road roughness and noise rise by receiving road environment and ambient noise information.

For example, the controller can increase the alarm time and change the alarm period to be shorter when rough road surfaces and audio volume levels are above the reference.

The controller 150 may be implemented with one processor.

The controller 150 may be implemented as a memory (not shown) that stores an algorithm for controlling the operation of components in a vehicle or data about a program that reproduces the algorithm, and a processor (not shown) that performs the above-described operation using data stored in the memory. In this case, the memory and the processor may be implemented as separate chips, respectively. Alternatively, the memory and processor may be implemented as a single chip.

The storage 150a stores identification information and location information of a plurality of seats, and stores identification information and location information of a plurality of occupant detectors. Here, the location information of the plurality of occupant detectors may correspond to the location information of the plurality of seats, respectively.

The storage 150a stores identification information and location information of a plurality of sound input devices. Here, location information of the plurality of sound input devices may correspond to location information of the plurality of seats, respectively.

The storage 150a may store identification information and location information of a plurality of sound output devices. Here, location information of the plurality of sound output devices may correspond to location information of the plurality of seats, respectively.

The storage 150a may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory; a volatile memory element, e.g., a Random Access Memory (RAM); or a storage medium, e.g., a Hard Disk Drive (HDD) and a CD-ROM. The implementation of the storage is not limited thereto.

The storage 150a may be a memory that is implemented by a separate chip from the aforementioned processor related to the controller 150 or the storage 150a may be implemented by a single chip with a processor.

The transceiver 160 communicates with the user terminal 2.

The transceiver 160 may include one or more components enabling communication between vehicle internal components, and for example, may include at least one of a short-range communication module, a wired communication module, and a wireless communication module.

The short-range communication module may include various short-range communication modules that transmit and receive signals using a wireless communication network in a short range, such as a Bluetooth module, an infrared communication module, an RFID (radio frequency identification) communication module, a WLAN (wireless local access network) communication module, an NFC communication module, a Zigbee communication module, etc.

The wired communication module may include various cable communication modules such as a controller area network (CAN) communication module, a local area network (LAN) module, a wide area network (WAN) module or a value added network (VAN) module, etc., as well as various wired communication modules such as a universal serial bus (USB), a high definition multimedia interface (HDMI), a digital visual interface (DVI), a recommended standard-232 (RS-232), a power line communication, or a plain old telephone service (POTS), etc.

The wired communication module may further include a local interconnect network (LIN).

The wireless communication module may include a wireless communication module supporting various wireless communication methods such as global system for mobile communication (GSM), code division multiple access (CDMA), wideband code division multiple access (WCDMA), and universal mobile telecommunications system (UMTS), time division multiple access (TDMA), long term evolution (LTE), and ultra wide band (UWB) modules, etc. in addition to a Wi-Fi module and a Wi-Bro module.

The user terminal 2 communicates with the vehicle.

The user terminal 2 may be implemented as a computer or a portable terminal capable of communicatively connecting to the vehicle 1 through a network.

Here, the computer includes, for example, a notebook equipped with a web browser, a desktop, a laptop, a tablet PC, a slate PC, and the like. The portable terminals are, for example, wireless communication devices that guarantee portability and mobility, and include all kinds of handheld-based wireless communication devices, such as personal communication system (PCS), global system for mobile communications (GSM), personal digital cellular (PDC), personal handyphone system (PHS), personal digital assistant (PDA), international mobile telecommunication (IMT)-2000, code division multiple access (CDMA)-2000, w-code division multiple access (W-CDMA), wireless broadband internet (WiBro) terminal, smart phone, etc. In addition, the portable terminal may include a wearable device such as a watch, a ring, a bracelet, an anklet, a necklace, glasses, contact lenses, or a head-mounted-device (HMD).

At least one component may be added or deleted corresponding to the capabilities of the components of the authentication device shown in FIG. 3. In addition, it will be readily understood by those of ordinary skill in the art that the mutual positions of the components may be changed in response to the performance or structure of the system.

Meanwhile, each component illustrated in FIG. 3 refers to software and/or hardware components such as a field programmable gate array (FPGA) and an application specific integrated circuit (ASIC).

As shown in FIG. 4, the controller 150 includes an environment recognition unit 151 that recognizes the environment inside the vehicle, and an alarm determination unit 152 that determines alarm information on a route to be output, and may further include a road surface recognition unit 153 for recognizing the type of road surface.

The alarm determination unit 152 may include a type determination unit 152a that determines at least one of a visual type, an audible type, and a haptic-type as an alarm type based on the internal environment, a level determination unit 152b that determines the visual type alarm level, the audible type alarm level, and the haptic-type alarm level based on the internal environment, and a time determination unit 152C that determines an alarm time to output alarm information for visual type, an alarm time to output alarm information for audible type, and an alarm time to output alarm information for haptic-type based on the internal environment.

When the alarm type is determined as a visual type, alarm information can be output through the cluster, the first display, and the display of the vehicle terminal. The background color and image of the cluster, the first display, and the display of the vehicle terminal are displayed, or the lamp can be lit.

When the alarm type is determined as the visual type, the alarm level can be expressed by changing the color to red, orange, and yellow.

When the alarm type is determined as the visual type, the time to change the background color, the display time of the alarm image, and the lighting time of the lamp can be defined as the alarm time.

When the alarm type is determined as the audible type, alarm information can be output through the sound output device.

When the alarm type is determined as the audible type, the alarm level can be expressed by changing the volume level of the alarm sound.

When the alarm type is determined as the audible type, the output time of the alarm sound can be defined as the alarm time.

When the alarm type is determined as haptic-type, alarm information can be output through the vibration generator.

When the alarm type is determined as haptic-type, the alarm level can be expressed by changing the level of the vibration intensity.

When the alarm type is determined as haptic-type, the vibration occurrence time can be defined as the alarm time.

Embodiments of the present disclosure can improve user awareness of driving risk by changing the alarm type, alarm level and alarm time according to the driving environment of the vehicle such as the vehicle external situation and the vehicle internal situation, and minimize the user's discomfort due to excessive alarm.

Accordingly, embodiments of the present disclosure can improve the safety of the vehicle and reduce the risk of a traffic accident.

Embodiments of the present disclosure can change the alarm type, alarm level, and alarm time output from the driver assistance system according to the driving environment of the vehicle, such as the external situation of the vehicle and the internal situation of the vehicle.

Embodiments of the present disclosure can improve the marketability of the vehicle while preventing the increase in vehicle cost by changing the alarm algorithm even when the hardware configuration is not added.

As such, embodiments of the present disclosure can improve the quality of a driver assistance system and a vehicle having a driver assistance system, and further enhance user satisfaction and secure product competitiveness.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The embodiments of the disclosure have thus far been described with reference to the accompanying drawings. It will be obvious to those of ordinary skill in the art that the disclosure may be practiced in other forms than the embodiments as described above without changing the technical idea or essential features of the disclosure. The disclosed embodiments are illustrative and should not be construed as limiting.

What is claimed is:

1. A vehicle comprising:
   a display configured to output visual type alarm information;
   a sound output device configured to output audible type alarm information;
   a vibration generator mounted in a driver's seat and configured to output haptic-type alarm information by generating vibration;
   a sound input device configured to receive a sound; and
   a controller configured to:
      determine whether or not a function of outputting an audio signal through the sound output device is performed;
      when it is determined that the function is not being performed, determine a visual type and an audible type as a primary alarm type;
      when it is determined that the function is being performed, determine the visual type and a haptic-type as the primary alarm type and determine the audible type as a secondary alarm type;
      determine whether a driver is in an utterance state based on sound information about the sound received by the sound input device;
      determine the visual type and the haptic-type as the primary alarm type when it is determined that the driver is in the utterance state; and
      determine the visual type, the haptic-type, and the audible type as the primary alarm type when it is determined that the driver is not in the utterance state.

2. The vehicle of claim 1, wherein the controller is configured to determine a reference alarm level as an alarm level when it is determined that the driver is not in the utterance state and determine a first alarm level higher than the reference alarm level as the alarm level when it is determined that the driver is in the utterance state.

3. The vehicle of claim 1, wherein the controller is configured to determine a reference alarm level as an alarm level and store it as primary alarm information when it is determined that the driver is not in the utterance state, and determine a first alarm level higher than the reference alarm level as the alarm level and store it as the primary alarm information when it is determined that the driver is in the utterance state.

4. The vehicle of claim 3, wherein the controller is configured to store the first alarm level higher than the reference alarm level as secondary alarm information when it is determined that the driver is in the utterance state, and store a third alarm level higher than a second alarm level as tertiary alarm information.

5. The vehicle of claim 4, wherein the controller is configured to store an alarm type of audible type as the secondary alarm information and the tertiary alarm information when storing the secondary alarm information and the tertiary alarm information.

6. The vehicle of claim 5, wherein the controller is configured to transmit the primary alarm information, the secondary alarm information, and the tertiary alarm information to a driver assistance system.

7. The vehicle of claim 5, further comprising an obstacle detector, wherein the controller is configured to control to output the primary alarm information, the secondary alarm information, and the tertiary alarm information based on obstacle information detected by the obstacle detector.

8. The vehicle of claim 4, wherein the controller is configured to store the first alarm level as the secondary alarm information when it is determined that the driver is not in the utterance state, and store the second alarm level as the tertiary alarm information.

9. The vehicle of claim 1, wherein the controller is configured to determine a reference alarm time and store the reference alarm time as primary alarm information when it is determined that the driver is not in the utterance state, and determine a first alarm time longer than the reference alarm time as a first alarm time and store the first alarm time as the primary alarm information when it is determined that the driver is in the utterance state.

10. The vehicle of claim 9, wherein the controller is configured to store the first alarm time longer than the reference alarm time as secondary alarm information when it is determined that the driver is in the utterance state, and store a third alarm time longer than the first alarm time as tertiary alarm information.

11. The vehicle of claim 9, wherein the controller is configured to store the first alarm time as secondary alarm information when it is determined that the driver is not in the utterance state and store a second alarm time as tertiary alarm information.

12. The vehicle of claim 1, wherein the controller is configured control a cancellation of the audio signal when outputting the audible type alarm information.

13. A vehicle comprising:
   a display configured to output visual type alarm information;
   a sound output device configured to output audible type alarm information;
   a vibration generator mounted in a driver's seat and configured to output haptic-type alarm information by generating vibration;

a sound input device;

an occupant detector configured to detect an occupant and output occupant information on the detected occupant; and a controller configured to:

determine a visual type and a haptic-type as an alarm type to prevent two or more occupants discomfort when it is determined that there are two or more occupants based on the occupant information;

determine a visual type, a haptic-type, and an audible type as the alarm type when it is determined that there is one occupant based on the occupant information;

determine whether a driver is in an utterance state based on sound information about a sound received by the sound input device; and determine the visual type and the haptic-type as the alarm type alarm type and increase an alarm level of the visual type and the haptic-type when it is determined that the driver is in the utterance state.

14. The vehicle of claim 13, wherein the controller is configured to acquire location information of a talker based on sound information about the sound received by the sound input device, determine whether the driver is the talker based on the acquired location information of the talker, and determine an alarm level of the determined alarm type as a reference alarm level when it is determined that the driver is not the talker.

15. The vehicle of claim 13, wherein the controller is configured to acquire location information of a talker based on sound information about the sound received by the sound input device, determine whether the driver is the talker based on the acquired location information of the talker, determine an alarm time of the determined alarm type as a reference alarm time when it is determined that the driver is not the talker, and determine the alarm time of the determined alarm type as an alarm time higher than the reference alarm time when it is determined that the driver is the talker.

16. The vehicle of claim 13, wherein the controller is configured to acquire location information of a talker based on sound information about the sound received by the sound input device, determine whether the driver is the talker based on the acquired location information of the talker, determine an alarm period of the determined alarm type as a reference alarm period when it is determined that the driver is not the talker, and determine the alarm period of the determined alarm type as an alarm period less than the reference alarm period when it is determined that the driver is the talker.

17. The vehicle of claim 13, wherein the controller is configured to determine whether a function of outputting an audio signal through the sound output device is performed when outputting the audible type alarm information, control a cancellation of the audio signal when it is determined that the function is being performed, and output the audible type alarm information through the sound output device.

18. The vehicle of claim 13, wherein the controller is configured to transmit the determined alarm type to a driver assistance system.

19. A driver assistance system comprising:

a display configured to output visual type alarm information;

a sound output device configured to output audible type alarm information;

a vibration generator mounted in a driver's seat and configured to output haptic-type alarm information by generating vibration; and a controller configured to determine whether an occupancy rate is two or more and a driver is a talker based on sound information in a vehicle and occupant information in the vehicle, determine a visual type, a haptic-type, and an audible type as an alarm type when it is determined that the occupancy rate is one and the driver is not the talker, determine a visual type and a haptic-type as the alarm type when it is determined that the occupancy rate is two or more or the driver is the talker, and control an output of alarm information based on the determined alarm type.

20. The driver assistance system of claim 19, wherein the controller is configured to determine a reference alarm level, a reference alarm time, and a reference alarm period as alarm information when it is determined that the occupancy rate is one and the driver is not the talker, and determine an alarm level higher than the reference alarm level, an alarm time longer than the reference alarm time, and an alarm period shorter than the reference alarm period as the alarm information when it is determined that the occupancy rate is two or more or the driver is the talker.

21. The driver assistance system of claim 19, further comprising an obstacle detector, wherein the controller is configured to control to output the alarm information based on obstacle information detected by the obstacle detector.

* * * * *